US009563466B2

(12) United States Patent
Nalluri et al.

(10) Patent No.: US 9,563,466 B2
(45) Date of Patent: Feb. 7, 2017

(54) METHOD AND APPARATUS FOR SUPPORTING PROGRAMMABLE SOFTWARE CONTEXT STATE EXECUTION DURING HARDWARE CONTEXT RESTORE FLOW

(71) Applicants: Hema Chand Nalluri, Hyderabad (IN); Jeffery S. Boles, Folsom, CA (US); Murali Ramadoss, Folsom, CA (US); Aditya Navale, Folsom, CA (US); Lalit K. Saptarshi, Bangalore (IN)

(72) Inventors: Hema Chand Nalluri, Hyderabad (IN); Jeffery S. Boles, Folsom, CA (US); Murali Ramadoss, Folsom, CA (US); Aditya Navale, Folsom, CA (US); Lalit K. Saptarshi, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 14/072,622

(22) Filed: Nov. 5, 2013

(65) Prior Publication Data
US 2015/0123980 A1    May 7, 2015

(51) Int. Cl.
*G06F 9/46* (2006.01)
*G06T 1/20* (2006.01)

(52) U.S. Cl.
CPC ............. *G06F 9/461* (2013.01); *G06T 1/20* (2013.01)

(58) Field of Classification Search
None
See application file for complete search history.

(56) References Cited

U.S. PATENT DOCUMENTS

| 7,173,627 B2 * | 2/2007 | Doyle ............... G06F 9/463 345/501 |
| 2004/0039822 A1 * | 2/2004 | Bensimon ....... G06F 17/30899 709/227 |

(Continued)

FOREIGN PATENT DOCUMENTS

| KR | 10-2004-0014588 | 2/2004 |
| WO | WO 03/003206 A2 | 1/2003 |

OTHER PUBLICATIONS

Sedory ("Removing the Mystery from segment: Offset Addressing", 2007, http://thestarman.pcministry.com/asm/debug/Segments.html).*

*Primary Examiner* — Kee M Tung
*Assistant Examiner* — Xin Sheng
(74) *Attorney, Agent, or Firm* — Blakely, Sokoloff, Taylor & Zafman LLP

(57) ABSTRACT

A method and apparatus for supporting programmable software context state execution during hardware context restore flow is described. In one example, a context ID is assigned to graphics applications including a unique context memory buffer, a unique indirect context pointer and a corresponding size to each context ID, an indirect context offset, and an indirect context buffer address range. When execution of the first context workload is indirected, the state of the first context workload is saved to the assigned context memory buffer. The indirect context pointer, the indirect context offset and a size of the indirect context buffer address range are saved to registers that are independent of the saved context state. The context is restored by accessing the saved indirect context pointer, the indirect context offset and the buffer size.

25 Claims, 9 Drawing Sheets

(56) References Cited

U.S. PATENT DOCUMENTS

| | | | |
|---|---|---|---|
| 2007/0103476 A1* | 5/2007 | Huang | G06T 15/005 345/522 |
| 2007/0283352 A1* | 12/2007 | Degenhardt | G06Q 10/06 718/100 |
| 2015/0110264 A1* | 4/2015 | Wu | H04L 9/0643 380/28 |

* cited by examiner

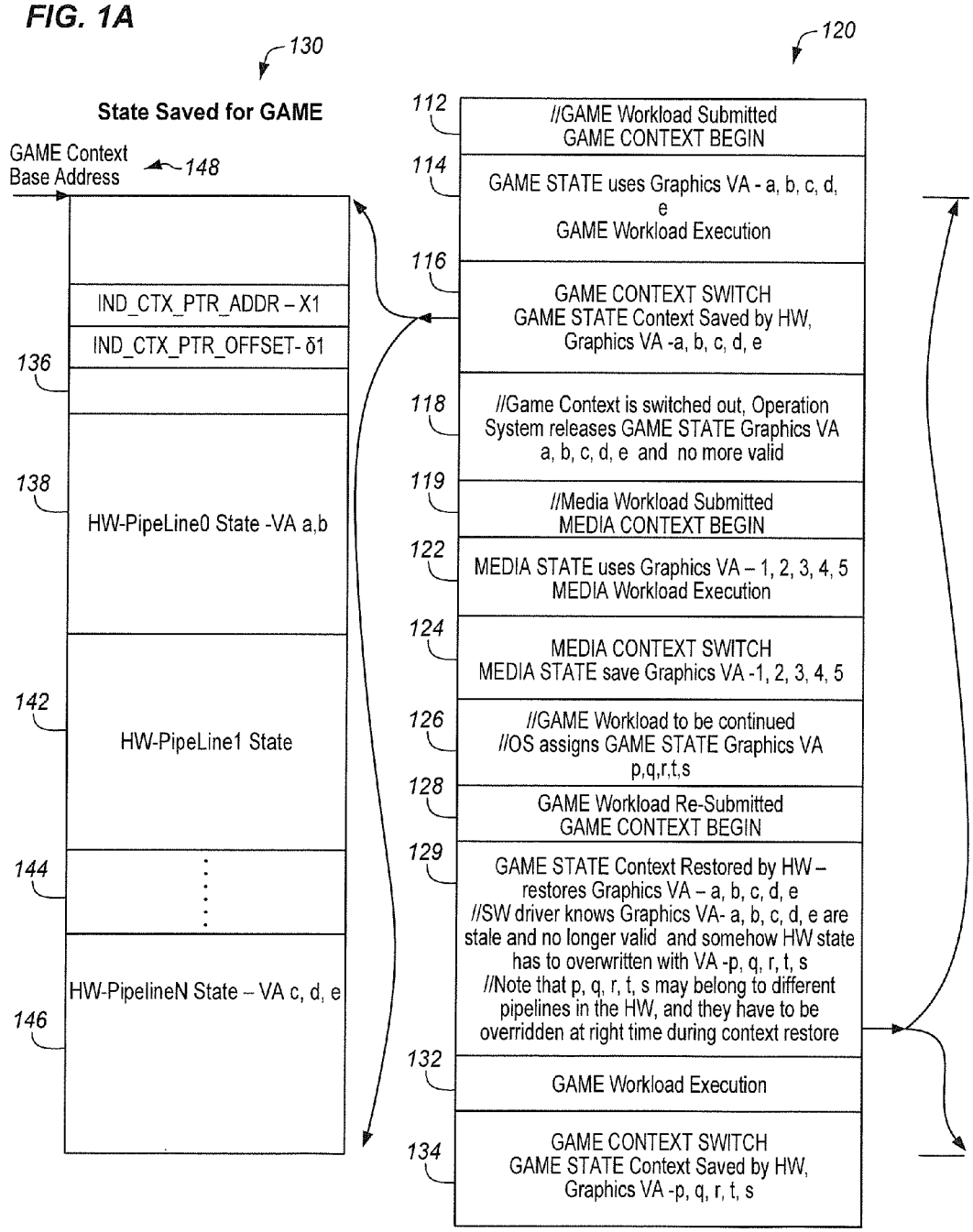

METHOD AND APPARATUS FOR SUPPORTING PROGRAMMABLE SOFTWARE CONTEXT STATE EXECUTION DURING HARDWARE CONTEXT RESTORE FLOW

FIELD

The present description pertains to the field of graphics application execution and, in particular, to restoring a context after indirection.

BACKGROUND

In the execution of graphics workloads by a graphics processing unit in a computing system, an application through the operating system (OS) submits a workload to a graphics driver. The graphics driver configures the workload so that the graphics processing unit can execute it. Each workload can be partitioned into multiple graphics applications which are also referred to as contexts. Each context runs through each stage of a pipeline of the graphics processing hardware to render graphics on a display. The graphics driver assigns a unique context ID (Identifier) for each graphics application. Each time an application submits a workload to the graphics driver, the graphics driver identifies it with the context ID and then submits it to the graphics processing unit (GPU).

The graphics processing unit executes each context until the context is completed or until the context is interrupted. The graphics hardware detects a context switch when a sequence of instructions in the context comes to a change in the context ID. A context may be switched out by the graphics driver for any of a variety of different reasons. A particular context may be preempted by a higher priority context. A context may be switched out if it stalls because of a wait for events. This allows another context to be executed while the stalled context continues to wait. A context may also be switched out so that another context can produce intermediate results that are required by the context to continue executing. The switching out of one context and switching in of another context is referred to as an indirection.

When the context is switched out, the current state of the context is saved by the hardware. When the context is switched back in, the saved state is restored by the hardware. The saved context state contains the hardware state of the context at the point of context switch. This includes graphics addresses for surfaces that are exercised by the context (e.g. vertex buffers, stream out buffers, depth buffers, render target, sampler textures maps, kernel state pointers for various shaders, etc.).

The addresses used to store graphics memory surfaces are pinned. As long as an application is running, the graphics memory surfaces remain intact and can be used as is on when the context is resubmitted by the graphics driver to the GPU.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1A is a hardware logic diagram with a context state buffer and an indirection instruction stack for saving a state in the context state buffer according to an embodiment of the invention.

DETAILED DESCRIPTION

Figure 1B:
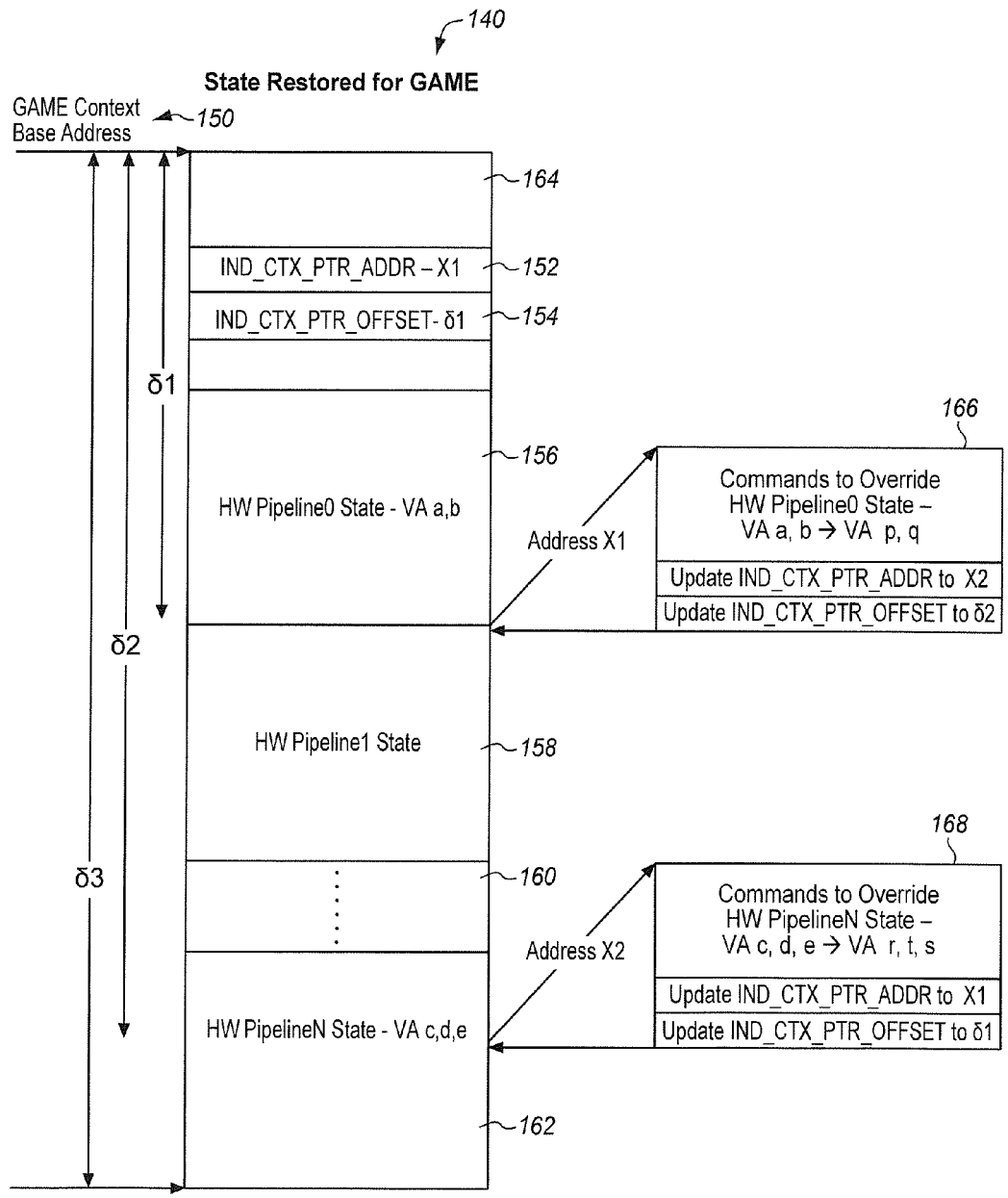
FIG. 1B is a hardware logic diagram with a context state restore instruction stack connected to the component of FIG. 1 according to an embodiment of the invention.

With memory resources not pinned, the operating system (OS) can swap the memory pages to another location when the context is switched out. With this kind of a memory swap by the OS, the graphics addresses belonging to the memory resources of the inactive context will change. If the context state is switched back in, then the context state needs to be updated with the new graphics addresses. The graphics hardware can then use the updated addresses to restore the context.

The hardware can assist in updating the graphics addresses when there are changes. A hardware context state may be saved by the hardware and this may be used when restoring a context. The OS, application, or graphics driver will typically resubmit a context in order to restore a saved context. The resubmitted context will have graphics addresses for the hardware to use when restoring the context. The resubmitted context will have graphics addresses for the hardware to use when restoring the context. Addresses, and in particular virtual addresses, are used as one example of updating a context state. However, any other desired aspect of the state can be overridden using this techniques described herein. This is explained in further detail blow. There are many other usage models in which the state and workload may have changes between submissions. A variety of different state and workload changes may be made using the methods and apparatus described herein.

The hardware can use the context state that is provided by the software to override the graphics addresses of its own saved state during restore. The context state provided by the SW may be substantial or it may be the very minimum required to override the required graphics addresses.

The context state restored by the hardware may have order dependencies. As a result, the context state provided by SW may be used together with a mechanism to override the state from the resubmitted context at the exact location of indirection. This may be during the instruction flow that restores the indirected context.

The context state provided by the software can override the hardware context sate restored by the GPU for a resubmitted context at multiple places during the restoration of a HW context. In other words, there may be more than one instance of overriding a previous state during the hardware context restoration of a resubmitted context. In addition, multiple states can be supported using saved register values for the indirection.

In the examples herein, values may be saved by the hardware in an Indirect Context Pointer Register and an Indirect Context Pointer Offset Register for each context. In this example, the indirect context pointer points to a buffer in graphics memory which has the state provided by the software to override the hardware state. This state may be in the form of commands to be executed by the hardware to restore an indirected context. The indirect context pointer also indicates the buffer size for execution. The indirect context pointer offset carries the offset from a base address in the context memory buffer of the hardware state. When the hardware reaches this offset during the context restore flow, it may trigger the execution of the command from the buffer pointed to by the indirect context pointer. After the execution of the commands from the indirect context pointer, the regular context restore execution may resume.

The indirect context pointer buffer can have commands to change the indirect context pointer and indirect context pointer offset so that this process can be triggered again at a latter point during a context restore.

In one example, the indirect context pointer and the indirect context pointer offset are maintained as MMIO (Memory Mapped Input/Output) registers in hardware. These registers may be maintained independently for each context and saved as part of the hardware state when the corresponding context is switched.

From the perspective of the graphics driver, the software assigns an indirect context pointer and an indirect context offset each time that a new context is created. These values are programmed into the hardware when the context is submitted to the hardware for the first time.

When the same context is resubmitted by the software, the software knows the hardware state that needs to be modified. The hardware state that needs to be modified is fixed for a given product. Based on the hardware state and its location in the context image, the software may create the required buffers and program the indirect context pointer offset correctly to override the required hardware state during a restoration of a previous context. Before resubmitting the context, the software updates the indirect context pointer buffers corresponding to the context with the updated hardware state.

FIG. 1 is a diagram to show context indirection, pointers, and buffers. In the example of FIG. 1, there are two contexts a 3D Game Context and a Media Context. This represents an example in which a single computing device is used for playing a game and also for rendering media, for example playing a movie. These two contexts are used as simplified examples. A game and a movie player may both have multiple contexts each and there may be many more contexts. Various background services may also have a context. In addition, any one particular context may include indirection to another related context. These two contexts are provided as examples, however, the same principles may be applied to any other two or more contexts whether of the same or different types.

The processes performed by the graphics hardware are shown in the center column 120. The buffers for saving the hardware state of a context for each pipeline stage are shown in the left side column 130. The buffers for restoring the hardware state of a context for each pipeline stage are shown in the left side column 140. At the top of the process flow, the game context is submitted to the graphics engine at 112. The context initiates a workflow and includes graphics addresses to be used in performing the workload of the context. The graphics engine then begins to execute the workload.

At 114, the game context uses a set of registers in a graphics buffer to store instructions and results. These registers are indicated as virtual addresses (VA) to the graphics memory a, b, c, d, e. The actual logical and physical addresses will have different real names and there may be many more than 5 addresses. At 116, there is an indirection. The media context has been submitted and so the state of the game context is saved by the graphics engine. Since the context was originally assigned to use VA a, b, c, d, e, the context state is saved with those addresses.

Referring to the left side buffer diagram 130, the hardware state is saved in a range of buffers 130. The left 130 and right 140 side columns are hybrid diagrams of instruction execution for a set of hardware graphics pipelines or a graphics engine. The columns also represent discrete sequences of registers containing buffered instructions for use by each of the graphics pipelines. Each column also indicates the same or different small portions of a much larger graphics buffer. Accordingly, the top line 148 of the left side column 130 represents the base address for the saved state of the game context. It also represents the header information for the instruction sequence and the command streamer for the pipelines. At the indirection instruction 116, the graphics engine saves the state of the game context to the buffers as shown in the left side column.

At the buffer 130, the first address for the saved state of the game context is indicated by the value in a register called Context Memory Buffer 148. Another value, the IND_CTX_PTR_ADDR or Indirect Context Pointer Address value, shown in the diagram as X1 points to a buffer in graphics memory which has the commands to be executed by the hardware to restore an indirected context, these commands are programmed by software with the required updated state to override the hardware state before resubmitting the context to hardware for execution. The indirect context pointer also indicates the buffer size for execution. The location of the register that contains the address is indicated as being a first section 136 of the buffer 130. This section does not correspond to any particular hardware. This section also contains the IND_CTX_PTR_OFFSET or Indirect Context Pointer Offset, indicated as having a value δ1. The indirect context pointer offset indicates the offset from the base address 148 at which the execution of the command from the buffer pointed to by the indirect context pointer is triggered. These two values, IND_CTX_PTR_ADDR and IND_CTX_PTR_OFFSET, are stored in appropriate registers when the state is saved. X1 indicates a first buffer in Graphics Memory to override state 1. δ1 indicates the offset from the context image base address at which Buffer1 has to be executed to override state1.

Block 138 of the left side column indicates a first set of registers to store context restore instructions for a first hardware pipeline, indicated here as pipeline 0. This is the position of some portion of the registers having addresses a, b, c, d, e, which are used by the game context to store intermediate values and surface addresses for the game context. Registers VA a, b are indicated as examples, however, in any actual context there are many more registers and so a, b is used simply to indicate that it is a fraction of the total number of registers.

Similarly, hardware pipeline1 has its state saved in a second section 142 of the buffer. This continues for all of the graphics pipelines indicated here as numbered 0, 1, . . . N.

Pipeline N 146 is indicated as being at the end of the buffer with the other pipelines 144 indicated as being in between pipeline 1 142 and pipeline N 146. Hardware pipeline N has its state saved in a last section 146 of this portion of the buffer which includes the last of the graphics address registers, shown as having values VA c, d, e. The end of this buffer is the last address at which the context is saved. This is the last address as indicated by the buffer size value in the indirect context pointer address.

Returning to the central column execution, after saving the context as shown with the left-side buffer diagram at 116, the graphics engine switches out the game context at 118. At this time, the operating system releases the graphics addresses, VA a, b, c, d, e that were being used by the game context. Alternatively, another entity, such as the application, the graphics driver, a virtual machine, or another entity responsible for memory management may release the registers. Switching out the first context allows a second context, in this example, a media context to be started.

The operating system or another responsible entity submits a media context at 119, although any other context may be submitted, depending on the particular implementation. With the workload submitted the workload for the media context may begin. The context will include a set of graphics address registers that the context may use for the workload execution. In this example at 122 graphics VA 1, 2, 3, 4, 5, are indicated as an example designation for the set of assigned addresses.

At 123 after the media context workload execution has progressed for some number of instructions, there is another indirection. The indirection may be a part of the media context or it may be submitted by the OS to allow a different unrelated context to be executed. In this example, for simplicity the graphics engine returns to the game context, however, there may be many more than two different contexts being executed in part and in sequence. With the indirection, the graphics engine saves the media context state using the assigned register values VA 1, 2, 3, 4, 5. This will happen in a manner similar to that suggested in the left side column buffer and pipeline hardware diagram 130, but is not shown in order to simplify the figure. As before, the OS will release these registers, then for use with the execution of the workload of other contexts.

At 126, the resubmitted context includes a new allocation of graphics memory addresses for the game context execution. The resubmitted context will include the original context ID provided the first time that this context was submitted. It will also include an identification of the graphics registers that are to be used to execute the workload of the context. These graphics registers are most likely a different set of graphics addresses than were originally assigned and most likely not the graphics addresses at which all of the results have been stored. Here they are indicated as VA p, q, r, s, t.

At 128, the game context is resubmitted. In response to receiving the resubmission of the game context, the graphics engine begins the operations that are used to restore the game context.

At 129, the graphics engine restores the game context from the saved state. This state was originally active in graphics address registers VA a, b, c, d, e. However, these registers are stale. The values originally stored there may have been overwritten by other contexts and may not be available because they are in use by other contexts. With memory shared between a general processing unit and graphics processing unit, those registers may be in use by the general processing unit for a completely unrelated process.

As a result, the stored hardware state from saving the context at 116 is retrieved as VA a, b, c, d, e whereas the updated values are p, q, r, s, t respectively. Before execution of the workload begins, the state of the context when the workload was indirected is restored.

The software system, for example, the software graphics driver knows that the previously used graphics address values or registers for the context VA a, b, c, d, e, are stale and are no longer valid for the context. The driver also knows that the saved context state needs to be written into the assigned graphics address registers VA p, q, r, s, t. The context restore process allows this to be done and it allows values to be restored for each pipeline.

The restore process is diagrammed in the right side column 140 which is similar to the left side column 130 in that corresponds to a set of buffer registers, restore instructions, and hardware pipelines at the same time. The right side graphics buffer registers include a basic section, 164, and sections 156, 158, 160, 162 for the state upon indirection of each of the graphics pipelines 0 to N. As graphics buffers, the basic section 164 has the registers 152, 154 for the indirect context pointer address X1 and the indirect context pointer offset δ1. These registers are accessed to direct the restore process to the appropriate place to begin with the restoration of the game context. The base address 148 plus the offset δ1 directs the restore process to start at address X1.

The location X1 has commands 166 to overwrite the first hardware pipeline state registers VA a, b with the SW updated values that are VA p, q. Once this is accomplished there are commands to update the indirect context pointer address to a new value, in this case from X1 to X2 and to update the indirect context pointer offset from δ1 to δ2. These commands and the relevant values may be modified by software after the context is originally saved. This indirection in the restore process allows the software to modify the pipeline state registers and change the indirect context pointer and indirect context offset based on available resources when the context is resubmitted. X2 indicates the next location in the graphics memory used to override the state for the next pipeline. δ2 indicates the offset from the context image base address 148 at which the buffer is executed.

Having completed the commands at address X1 to for the first pipeline, pipeline 0, the restore process resumes and continues until it reaches to the next location at address X2. Note that X2 is a distance or offset of δ2 from the base address. At X2 there are commands 168 to override the graphics address registers from VA c, d, e to VA r, s, t. As in the context of saving the use of registers identified as a, b, and registers, c, d, e is to show that some of the registers are updated at X1 and other registers are updated at address X2. Registers may be updated at many other locations in the sequence of instructions corresponding to the column 140. There may also be many more than two or three registers or two or three banks of registers. The use of a, b, c, d, e and p, q, r, s, t shows that the values from the context memory buffer are restored to the new working buffer addresses for the resubmitted context. The example buffer addresses a, b, c, d, e are presented here as examples. There are many other usage models in which the state and workload may have changes between submissions. A variety of different state and workload changes may be made using the methods and apparatus described herein.

In addition to the commands to override memory buffers, similar to 166, there are commands to update the indirect context pointer address and indirect context offset. Upon completion of these commands, the restore process returns to the main flow of restore instruction for the last pipeline, pipeline N. Note that in the first example the first context pointer indicates an address X1 at the end of the restore instructions for the pipeline. In the second example the pointer indicates an address X2 in the middle of the restore instructions for the pipeline.

The restore process ends when the end of the context memory buffer is reached. The last address in this buffer is indicated using the buffer size value or buffer address range that is stored when the context is originally saved. In one embodiment it is stored with the indirect context pointer, but it may alternatively be stored in other locations. In the example of FIG. 1, it is indicated as the value δ3 which is the offset from the base address 148 to the end of the buffer.

Upon reaching the end of the restore process of 129, the workload of the game context can be executed at 132. All of the surfaces and other values that were saved when the game context was first interrupted, suspended, or preempted are restored to the new address registers. The new address registers are those assigned when the context was resubmitted. The execution of the restored workload in the new registers then continues until the workload is completed or there is another indirection at 134. This indirection causes the game context to again be switched out by saving the context at its current state at the time of indirection.

Figure 2A:
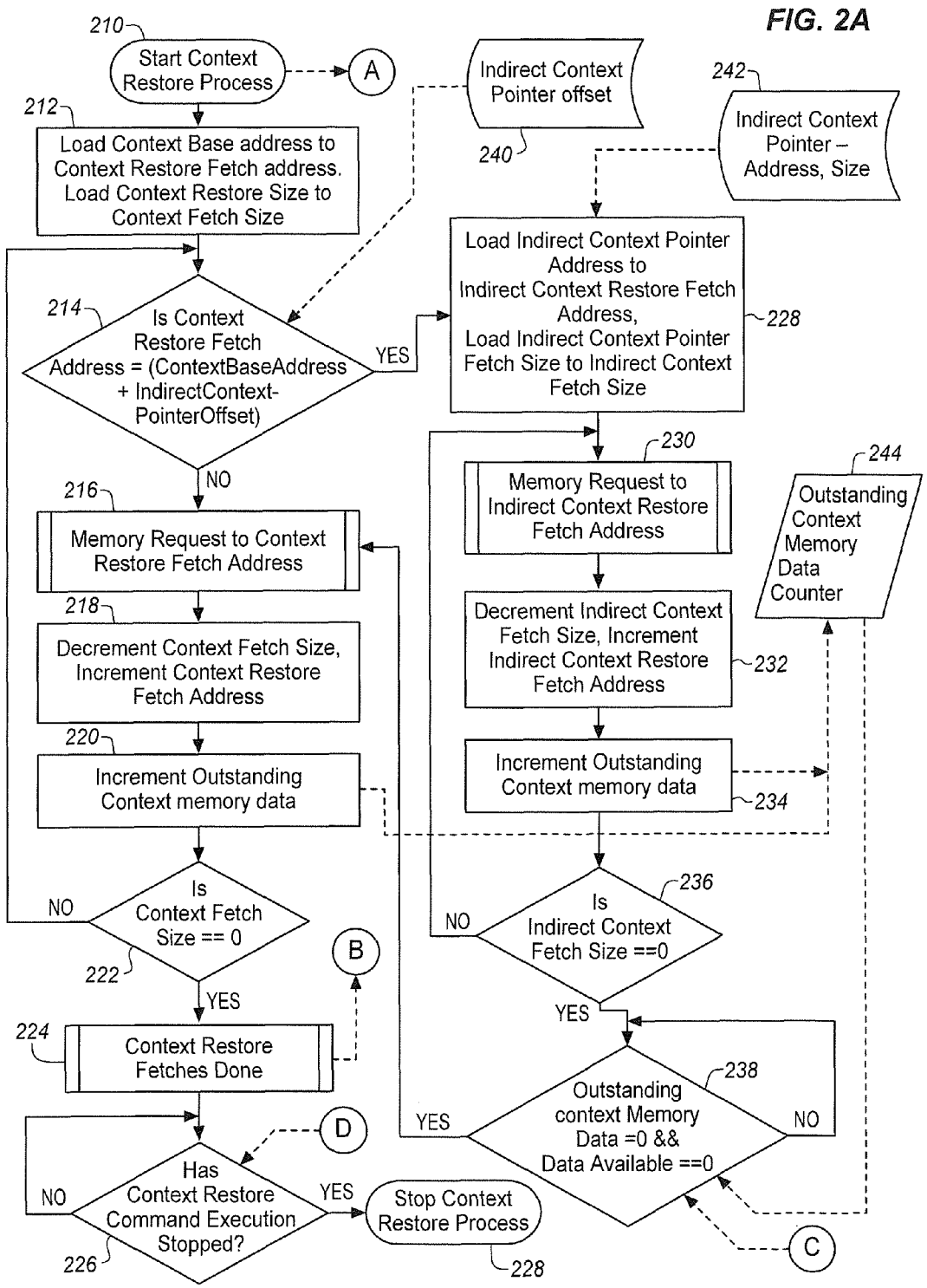
FIG. 2A is a first part of a process flow diagram for restoring a context according to an embodiment of the invention.
Figure 2B:
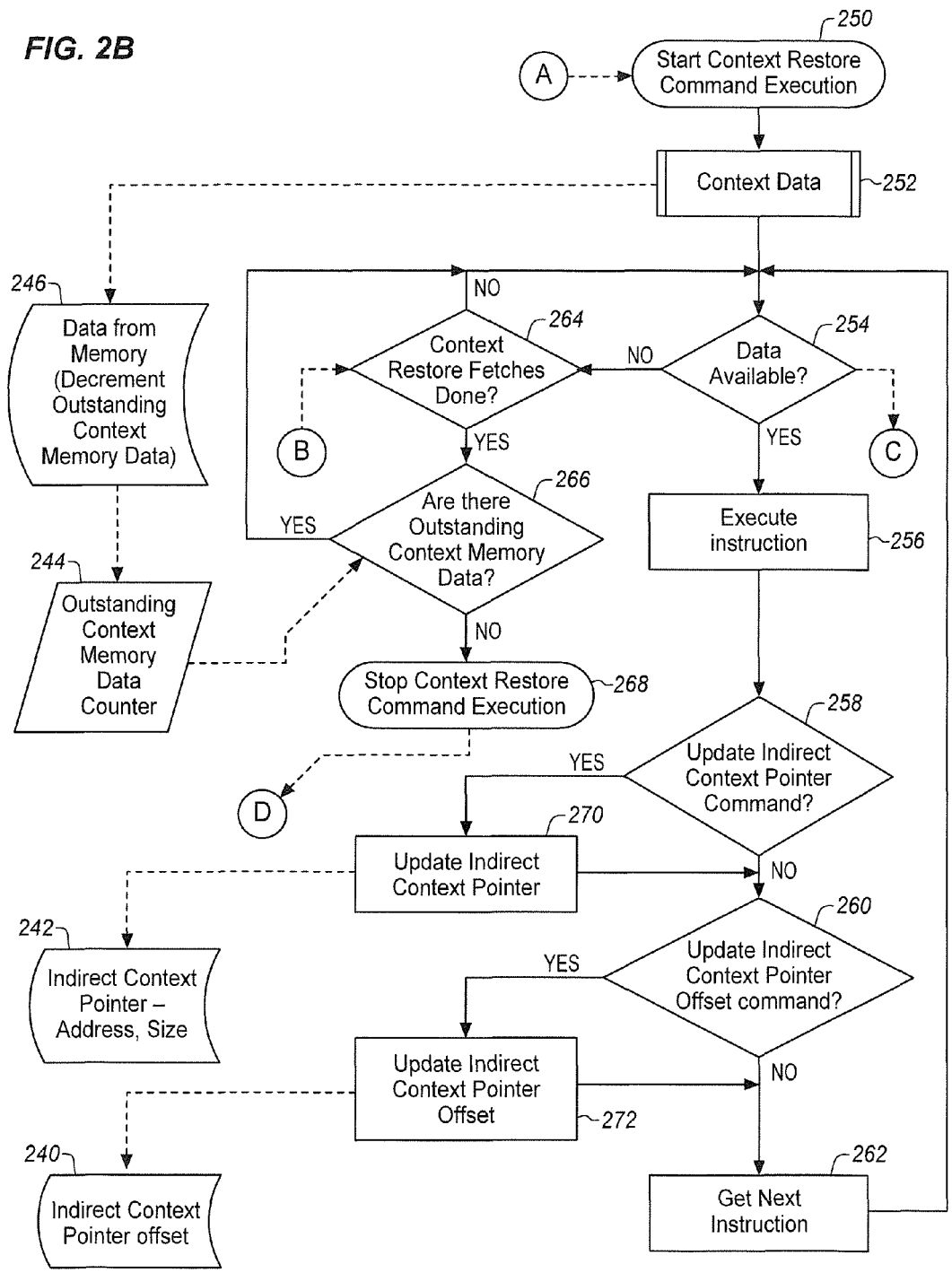
FIG. 2B is a second part of the process flow diagram of FIG. 2A for restoring a context according to an embodiment of the invention.

FIGS. 2A and 2B are process flow diagrams to show the context restore process from a different perspective. The process of restoring a saved context begins at 210. The restoration process is triggered when the graphics engine, upon executing one context, comes to a command to restore a previous process. This command is typically inserted by the operating system or an application to preempt a context. It may also be part of graphics workload that uses several different contexts to execute a single rendering process. The software agent can effect a context restore at any time by resubmitting a previous context. The resubmitted context will include values for an indirect context pointer offset 240, an indirect context pointer address, and an indirect context pointer size 242.

The graphics engine obtains the instructions that it will use to restore the previous context. To fetch the instructions, the graphics engine may first load the context base address to a context restore fetch address and load the context restore size to a context fetch size at 212. With these values loaded, the context restore fetch address can be compared to the context base address added to the indirect context pointer offset. If they are not equal, then the instruction can be fetched starting at the context restore fetch address at 216. The base address was loaded to the fetch address at 212 so the context restore loads from the base address. This corresponds to a case in which the context is being restored to the same registers from which it was saved.

With each instruction fetch starting with the base address, the context fetch size is decremented by one and the fetch address is incremented by one at 218. The outstanding context memory data is also incremented at 220. The outstanding context memory data value is fed to a counter 244. This continues until the entire set of restore instructions has been fetched. The context fetch size is compared after each fetch 216 and decrement 218 to zero at 222. When all the instructions are fetched, then the context restore fetches are completed at 224.

On the other hand, if at 214 the fetch address does equal the base address plus the indirect context pointer offset, then the instructions are fetched from a location indicated by the indirect context pointer. The address from the indirect context pointer 242 is loaded to the indirect context restore fetch address and the indirect context pointer fetch size is loaded to the indirect context fetch size at 228. The context restore instructions are then fetched using this information. The memory request is made to the new fetch address at 230. After each fetch, the indirect context pointer fetch address is incremented and the size is decremented at 230. The outstanding context memory data is incremented at 234 and fed to the counter 244. This fetch process repeats at 236 until the fetch size is depleted meaning that all of the instructions have been fetched.

When the context restore process begins at 210, there is an instruction fetch process as described above. There is also a process to execute the fetched context restore commands at 250. These instructions access context data at 252. The fetch process 216 or 230 will execute one or more instructions and then data will become available at 254 for the restore command execution. When the data is available, then instructions are executed at 256. After each execution at 262, the process returns to determine if there is more data available at 254 and if so, then another instruction is executed.

If there is no more data available at 254, then the command execution looks to see if all of the context restore fetches, that is instruction fetches, are done at 264. This decision uses information from the instruction fetch process at 224. If the restore fetches are not done, then the process returns to look for more data to execute at 254. This repeats until more data is found. Every memory request made at 216 and 230 will result in data from memory. The data retrieved from memory at 252 can be detected at 246 and, when it comes, it results in decrementing outstanding context memory data. At 246, the decrement happen If the context restore fetches are done at 264, then the execution process check for any remaining context memory data. If there is still more data to execute, then execution continues at 254. Otherwise the context restore command execution ends at 268. When this occurs, then the result is supplied to an overall process block 226 of FIG. 2A which determines whether the context restore command execution is stopped and, if so, then the context restore process ends.

The determination 226 in FIG. 2B of whether there is any outstanding context memory data can be made using the outstanding memory counter 244. This counter is incremented 220, 234 each time a request is made for and decremented 246 each time data for the request made to memory has returned.

As further shown in FIG. 2A when the memory buffer pointed to by the indirect context pointer buffer is depleted at 236, the outstanding context memory data counter 244 and the determination of whether this is any data available to execute at 254 are used together. This ensures that all of the instructions from the indirect context pointer are fetched and executed before proceeding further. When these both indicate that the fetch process from the indirect context pointer address is finished, then the original context restore fetch address can be used at 214 to fetch any additional instructions. The fetch from the base address 214 will continue as described above until this buffer is completed at 222 and the context restore fetches are done at 224.

While the context restore commands are executed at 256, it is possible to come across a command to update the indirect context pointer at 258 or to update the indirect context pointer offset at 260. These commands typically come together but this is not required. These instructions may come at any time to cause an indirection in the context restore process as shown in FIG. 1 at 166 and 168. The instruction will be inserted by the operating system or another software agent when the following instructions have been moved and ensure that the context is accurately restored.

When these commands are encountered, the indirect context pointer is updated at 270 or the indirect context pointer offset is updated at 272 or both depending on the command that occurred. As shown these commands can occur at any point in the command execution sequence. When they do occur, they are executed and the execution continues to the next instruction at 262.

Changing the indirect context pointer offset 240 based on a command 260 changes the context restore fetch process. After each instruction fetch 216, the context restore process checks at 214 the indirect context pointer offset 240. If it has changed, then the fetch process goes to the address indicated by the indirect context pointer and the pointer offset at 228 and fetches addresses from this location until this buffer is exhausted at 236. This corresponds to the indirection commands at 166, 168 that allow address X1 to be updated to X2 and the offset δ1 to be updated to δ2.

The process allows the software to override and update the hardware state between resubmissions of a context quickly and efficiently. The software simply inserts a new value in the indirect context pointer and indirect context pointer offset. These can be further update by commands in the restore process flow as the context is restored.

Figure 3A:
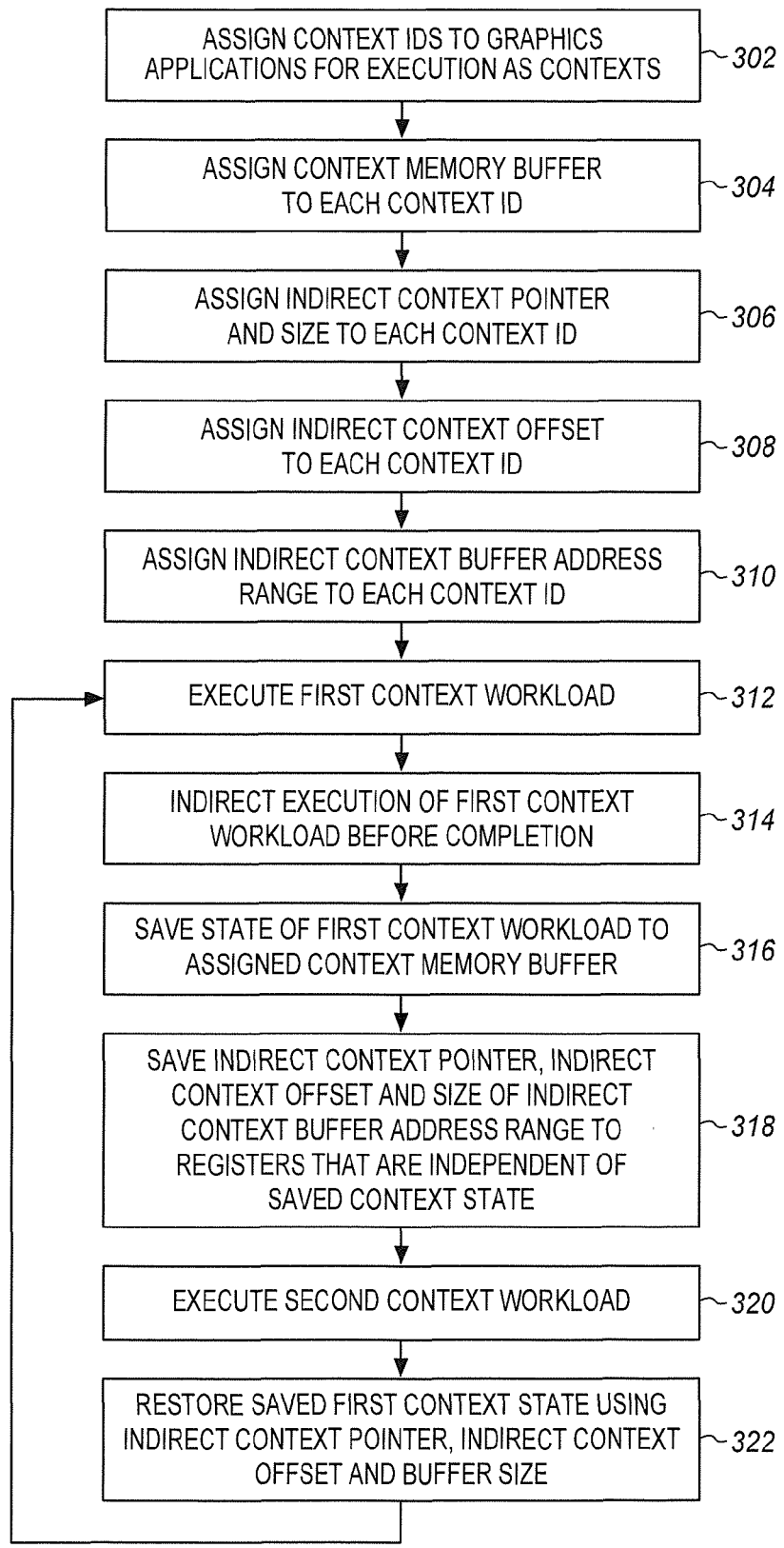
FIG. 3A is a simplified process flow diagram of indirecting from one context to another according to an embodiment of the invention.

FIG. 3A is a simplified process flow diagram of techniques described above. At 302, context IDs (Identifiers) are assigned to each of a plurality of graphics applications. The assignment may be made by a graphics driver or the OS. The graphics applications are to be executed by a graphics processor as contexts. At 304, a unique context memory buffer to each context ID.

At 306, a unique indirect context pointer is assigned to each context ID. The indirect context pointer points to an address in an indirect context buffer. A corresponding indirect context buffer size is also assigned to each context ID. At 308 an indirect context offset is assigned to each context ID. The indirect context offset indicates an offset into the indirect context buffer. Finally at 310, an indirect context buffer address range is assigned to each context ID. This states the range of buffer addresses for the indirect context buffer. The addresses may be virtual addresses, physical addresses, or any other type of address in a real or virtualized memory.

With the contexts defined as provided above, at 312, at least a part of a first context workload corresponding to an assigned context ID is executed. During execution of this context at 314, the execution of the first context workload is indirected before the execution of the context is completed.

At 316, at the time of indirection and upon switching away from the first context, the state of the first context workload is saved to the assigned context memory buffer. At 318, the indirect context pointer, the indirect context offset and a size of the indirect context buffer address range is saved to registers that are independent of the saved context state.

At 320 with the first context saved, the graphics processor executes at least a part of a second context workload. After some time at 322, the saved first context state is restored by accessing the saved indirect context pointer, the saved indirect context offset and the saved buffer size. At 312 execution of the first context workload is resumed. Because the first context state is saved it can be resumed. Because of the indirect context pointer and indirect context offset state, the saved state can be found even if the saved state has been moved or the original registers are no longer stable.

Figure 3B:
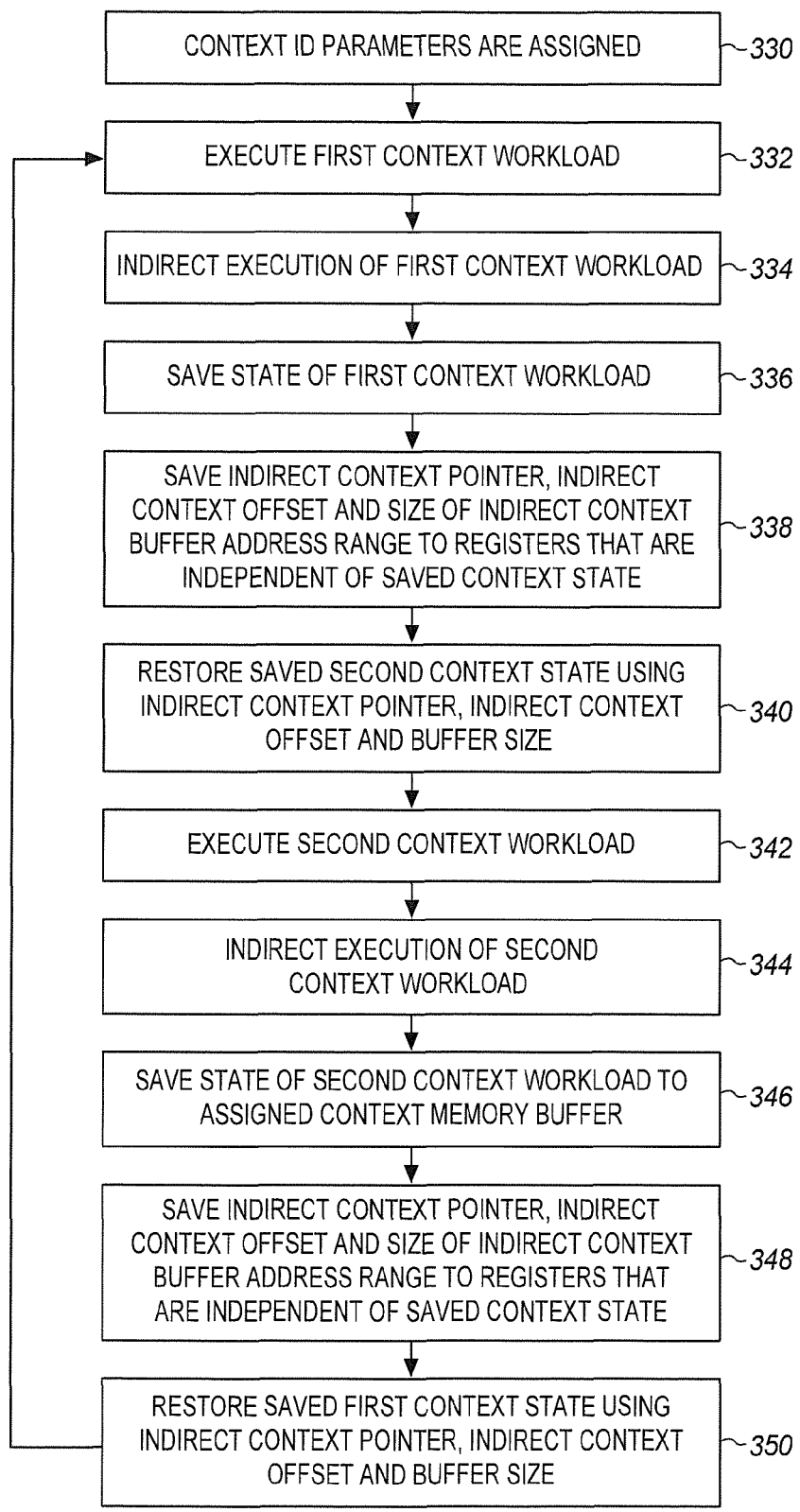
FIG. 3B is a simplified process flow diagram of indirecting between two or more different contexts according to an embodiment of the invention.

FIG. 3B is a simplified process flow diagram showing how contexts can be restored back and forth when there is a sequence of alternating indirections. While only two contexts are shown, there may be many more and the indirections may go from one context to another in any order as may be desired for smooth system operation. At 330, the context ID parameters are assigned. As indicated in FIG. 3A, these may include context IDs each with an associated context memory buffer, indirect context pointer, indirect context memory buffer size, indirect context offset, and indirect context buffer address range. Some of these parameters may not be required for every implementation. In addition, the same information may be assigned in different ways, for example, one parameter may be derived from two other, or an offset from an end or some other point may be used instead of an offset from a base address. Other variations are also possible, depending on the particular implementation.

With the contexts parameters set at 330, a first context workload is executed at 332. The first context workload execution is indirected at 334 and the current state of the current workload is saved at 336.

At 340, corresponding to an assigned context ID is executed. During execution of this context at 334, the execution of the first context workload is indirected before the execution of the context is completed. At 336 the indirect context pointer, the indirect context offset and a size of the indirect context buffer address range is saved to registers that are independent of the saved context state from 334.

At 340, a different context is restored. The indirection command indicates the indirect context pointer, the indirect context offset and a size of the indirect context buffer address range for the new context. These are used to find the saved context and restore it. While these values are initially saved by the graphics processor when saving the context, they may be changed by a graphics driver, application or operating system before the context is restored. At 342, the new restored context begins executing.

At 344 another indirection command is encountered. The execution of the second context is interrupted or suspended. At 346, the second context is saved. At 348, the indirect context pointer, the indirect context offset and a size of the indirect context buffer address range are saved. At 350, another context is restored and this process resumes execution. In the example of FIG. 3B, the indirection is to the first context and so execution of the first context workload resumes at 332. However, the indirection may be to any other context. The context may be one that was previously saved and is therefore restored. Alternatively, the indirection may be to a new context.

Figure 3C:
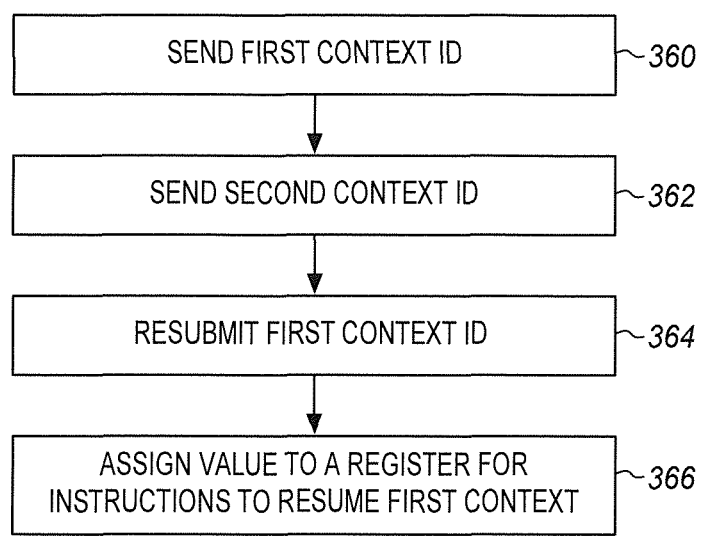
FIG. 3C is a simplified process flow diagram of another perspective of indirecting from one context to another according to an embodiment of the invention.

FIG. 3C provides an alternative perspective on a process flow diagram for at least some of the techniques described above. In the example of FIG. 3C at 360, a first context ID (identification) is sent to a graphics processor. The context ID identifies a graphics application to be executed by the graphics processor, a unique context memory buffer, a unique indirect context pointer, a corresponding size, an indirect context offset, and a buffer address range. The context ID may be generated and sent by one or a combination of a graphics driver, an application, and an operating system. The submission of the context ID is to cause the graphics processor to be indirected to the first context. Any currently operation process will be interrupted and the graphics process or diverted to the first context.

At 362, a second context ID is sent to the graphics processor for execution by the graphics processor. This will cause an indirection from the first context to the second context. At 364, the first context ID is resubmitted to the graphics processor to command the graphics processor to resume execution of the first context. Again the resubmission may include a graphics application to be executed by the graphics processor, a unique context memory buffer, a unique indirect context pointer, a corresponding size, an indirect context offset, and a buffer address range. These are used by the graphics processor to restore the first session as described above.

At 336, a value is saved to a register used by the graphics processor to fetch instructions to resume execution of the first context. Assigning a value may include updating a value of a first context pointer register used by the graphics processor as a base address for resuming execution of the first context, and updating a value of a first context pointer offset register used by the graphics processor as an offset from the base address for resuming execution of the first context. The value assignment allows the graphics processor to act autonomously to restore a context without any further participation by the OS or application.

Figure 4:
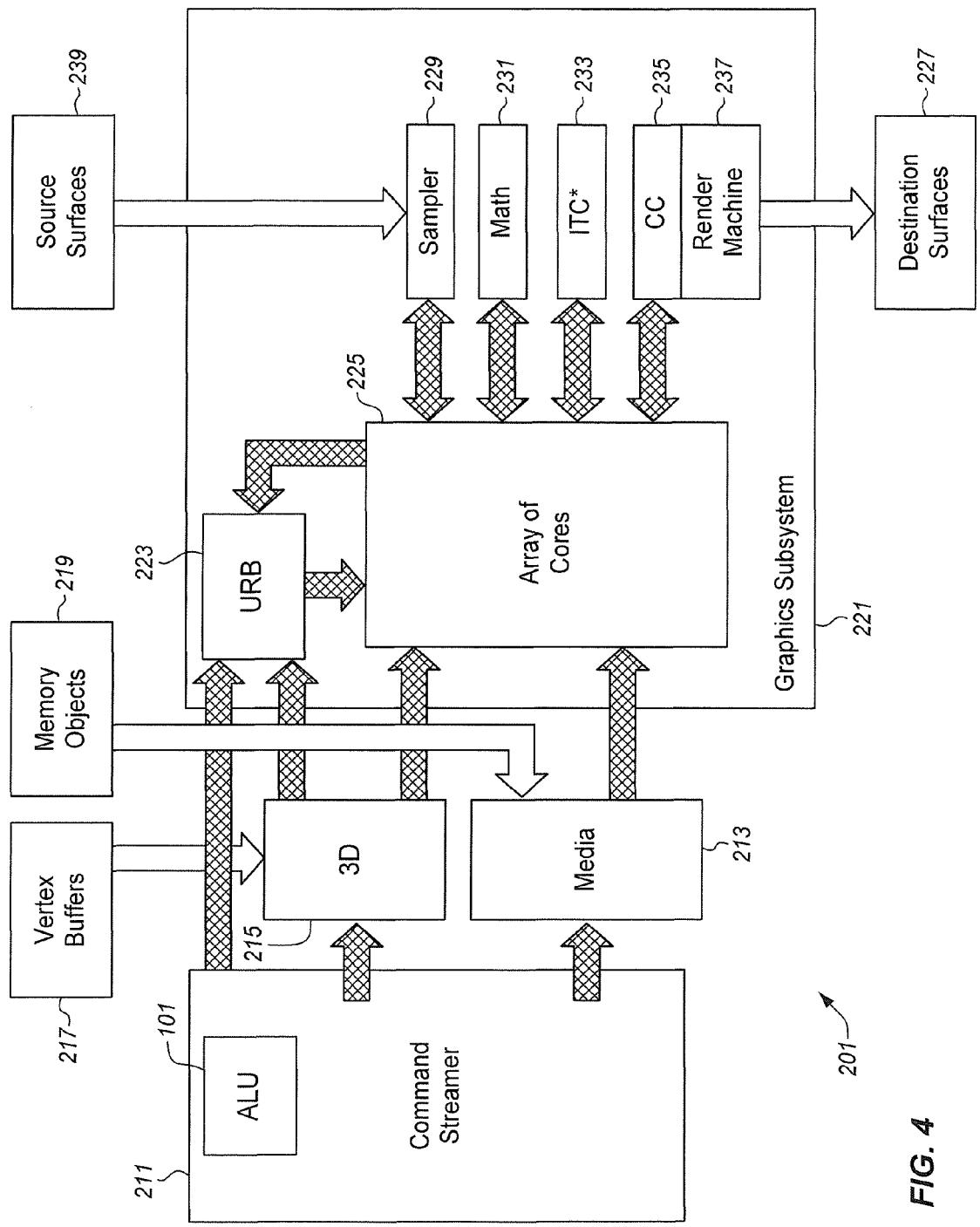
FIG. 4 is a block diagram of a portion of a graphics processing unit suitable for use with an embodiment of the invention.

FIG. 4 is a generalized hardware diagram of a graphics processing unit suitable for use with the present invention. The GPU 201 includes a command streamer 211 which contains an ALU 101. Data from the command streamer is applied to a media pipeline 213. The command streamer is also coupled to a 3D fixed function pipeline 215. The command streamer manages the use of the 3D and media pipelines by switching between the pipelines and forwarding command streams to the pipeline that is active. The 3D pipeline provides specialized primitive processing functions while the media pipeline performs more general functionality. For 3D rendering, the 3D pipeline is fed by vertex buffers 217 while the media pipeline is fed by a separate group of memory objects 219. Intermediate results from the 3D and media pipelines as well as commands from the command streamer are fed to a graphics subsystem 221 which is directly coupled to the pipelines and the command streamer.

The graphic subsystem 221 contains a unified return buffer 223 coupled to an array of graphics processing cores 225. This is referred to above as graphics engines. The unified return buffer contains memory that is that is shared by various functions to allow threads to return data that later will be consumed by other functions or threads. This is referred to above as memory, buffers, and registers. The array of cores 225 processes the values from the pipeline streamers to eventually produce destination surfaces 227. The array of cores has access to sampler functions 229, math functions 231, inter-thread communications 233, color calculators 235, and a render cache 237 to cache finally rendered surfaces. These are referred to above as pipelines or hardware pipelines. A set of source surfaces 239 is applied to the graphics subsystem 221 and after all of these functions 229, 231, 235, 237, 239 are applied by the array of cores, a set of destination surfaces 227 is produced. For purposes of general purpose calculations, the command streamer 211 and ALU are used to run operations to only the ALU or also through the array of cores 225, depending on the particular implementation.

Figure 5:
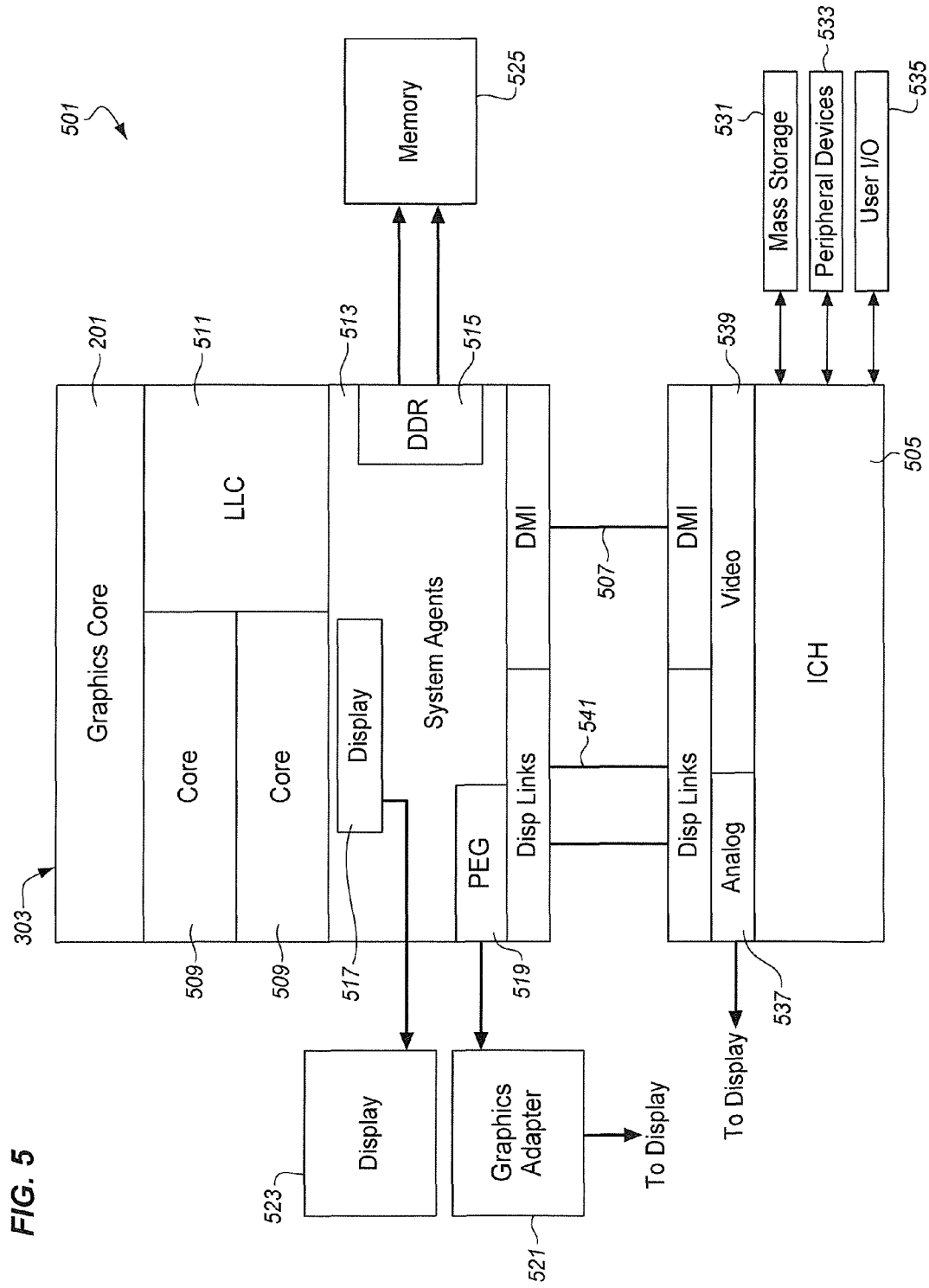
FIG. 5 is a block diagram of a computer system suitable for use with an embodiment of the invention.

Referring to FIG. 5, the graphics core 201 is shown as part of a larger computer system 501. The computer system has a CPU 503 coupled to an input/output controller hub (ICH) 505 through a DMI (Direct Media Interface) 507. The CPU has one or more cores for general purpose computing 509 coupled to the graphics core 201 and which share a Last Level Cache 511. The CPU includes system agents 513 such as a memory interface 515, a display interface 517, and a PCIe interface 519. In the illustrated example, the PCIe interface is for PCI express graphics and can be coupled to a graphics adapter 521 which can be coupled to a display (not shown). A second or alternative display 523 can be coupled to the display module of the system agent. This display will be driven by the graphics core 201. The memory interface 515 is coupled to system memory 525.

The input/output controller hub 505 includes connections to mass storage 531, external peripheral devices 533, and user input/output devices 535, such as a keyboard and mouse. Many systems allow the user to control the computer system and provide data to the computer or television using physical gestures such as but not limited to hand or body movements, facial expressions, and face recognition. To this end, the user input/output devices may include cameras, proximity sensors and microphones. The mass storage may be used to store operating system, drivers, and applications, parts of which may be loaded into the DDR memory 525 for use. The input/output controller hub may also include a display interface 537 and other additional interfaces. The display interface 537 is within a video processing subsystem 539. The subsystem may optionally be coupled through a display link 541 to the graphics core of the CPU.

A wide range of additional and alternative devices may be coupled to the computer system 501 shown in FIG. 5. Alternatively, the embodiments of the present invention may be adapted to different architectures and systems than those shown. Additional components may be incorporated into the existing units shown and more or fewer hardware components may be used to provide the functions described. One or more of the described functions may be deleted from the complete system.

While the graphics core 201 is shown as integrated with the CPU that also includes general processing cores 509 and other components, the graphics core may be constructed as a separate component with communication interfaces to the LLC and general purpose cores. Alternatively, the graphics core and its related components as shown, e.g. in FIG. 4 may be constructed on a separate die that is enclosed in the same or a different package. Other components, such as the memory 525, ICH 505 and system agents 513 may also be constructed on the same or different dies in the same or different packages.

Embodiments of the present invention provide a mechanism in which a context is restored based on a resubmission of the context ID together with graphics address values placed in specific registers. In the described example, this is done using an indirect context pointer and an indirect context pointer offset, however, the invention is not so limited. This provides a restoration of a previous context by the graphics engine without any further participation by the operating system, graphics driver, or any application.

A wide range of additional and alternative devices may be coupled to the computer system 501 shown in FIG. 5. Alternatively, the embodiments of the present invention may be adapted to different architectures and systems than those shown. Additional components may be incorporated into the existing units shown and more or fewer hardware components may be used to provide the functions described. One or more of the described functions may be deleted from the complete system.

It is to be appreciated that a lesser or more equipped system than the examples described above may be preferred for certain implementations. Therefore, the configuration of the exemplary systems and circuits may vary from implementation to implementation depending upon numerous factors, such as price constraints, performance requirements, technological improvements, or other circumstances.

Embodiments may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. Specifics in the examples may be used anywhere in one or more embodiments. In one embodiment, a method includes assigning a context ID (Identifier) to each of a plurality of graphics applications to be executed by a graphics processor as contexts, assigning a unique context memory buffer to each context ID, assigning a unique indirect context pointer and a corresponding size to each context ID, the indirect context pointer pointing to an address in an indirect context buffer, assigning an indirect context offset to each context ID, the indirect context offset indicating an offset into the indirect context buffer, assigning an indirect context buffer address range to each context ID, executing a part of a first context workload corresponding to an assigned context ID, indirecting execution of the first context workload before completion of the execution, saving the state of the first context workload at the time of indirection to the assigned context memory buffer upon switching away from the first context, saving the indirect context pointer, the indirect context offset and a size of the indirect context buffer address range to registers that are independent of the saved context state, executing at least a part of a second context workload, restoring the saved first context state after executing by accessing the saved indirect context pointer, the indirect context offset and the buffer size, and resuming executing the first context workload.

In some embodiments the assigned context memory buffer is used by the graphics processor to save the state for the corresponding context. In some embodiments saving the state of the first context comprises saving instructions to the assigned context memory buffer for execution when restoring the saved first context state.

Some embodiments include loading commands into the indirect context buffer to override context state restore commands. In some embodiments loading is a software process independent of the graphics processor restoring the saved first context. In some embodiments restoring the saved first context includes executing commands in the context memory buffer and, upon reaching a context memory buffer address corresponding to the indirect context offset, fetching the indirect context pointer and executing commands stored in a buffer address corresponding to the indirect context pointer.

In some embodiments fetching the indirect context pointer and executing commands stored in a buffer address corresponding to the indirect context pointer comprises suspending restoring from the context memory buffer and fetching from the memory addresses indicated by the indirect context pointer.

Some embodiments include after executing instructions fetched from the memory addresses indicated by the indirect context pointer then resuming restoring from the context memory buffer. In some embodiments instructions executed from the memory addresses indicated by the indirect context pointer include saving new values of the indirect context pointer and indirect context offset. In some embodiments indirecting comprises at least one of suspending, preempting, and interrupting execution of the first context.

Some embodiments include by a software agent that does not execute context workloads loading the indirect context pointer offset and the indirect context pointer into corresponding registers and sending an indirection command to restore the saved first context.

Some embodiments include receiving the first context ID during execution of the second context workload and wherein restoring the saved first context state comprises restoring the saved first context state in response to receiving the first context ID.

Some embodiments include saving the state of the second context before restoring the saved first context state. In some embodiments saving the state of the first context workload comprises saving addresses for surfaces that are exercised by the first context workload.

Some embodiments pertain to a machine-readable medium having instructions stored thereon that when executed by the machine cause the machine to perform operations that may include assigning a context ID (Identifier) to each of a plurality of graphics applications to be executed by a graphics processor as contexts, assigning a unique context memory buffer to each context ID, assigning a unique indirect context pointer and a corresponding size to each context ID, the indirect context pointer pointing to an address in an indirect context buffer, assigning an indirect context offset to each context ID, the indirect context offset indicating an offset into the indirect context buffer, assigning an indirect context buffer address range to each context ID, executing a part of a first context workload corresponding to an assigned context ID, indirecting execution of the first context workload before completion of the execution, saving the state of the first context workload at the time of indirection to the assigned context memory buffer upon switching away from the first context, saving the indirect context pointer, the indirect context offset and a size of the indirect context buffer address range to registers that are independent of the saved context state, executing at least a part of a second context workload, restoring the saved first context state after executing by accessing the saved indirect context pointer, the indirect context offset and the buffer size, and resuming executing the first context workload.

In some embodiments saving the state of the first context comprises saving instructions to the assigned context memory buffer for execution when restoring the saved first context state.

Some embodiments include loading commands into the indirect context buffer to override context state restore commands.

In some embodiments restoring the saved first context includes executing commands in the context memory buffer and, upon reaching a context memory buffer address corresponding to the indirect context offset, fetching the indirect context pointer and executing commands stored in a buffer address corresponding to the indirect context pointer. In some embodiments fetching the indirect context pointer and executing commands stored in a buffer address corresponding to the indirect context pointer comprises suspending restoring from the context memory buffer and fetching from the memory addresses indicated by the indirect context pointer.

Some embodiments include after executing instructions fetched from the memory addresses indicated by the indirect context pointer then resuming restoring from the context memory buffer. In some embodiments instructions executed from the memory addresses indicated by the indirect context pointer include saving new values of the indirect context pointer and indirect context offset.

Some embodiments include receiving the first context ID during execution of the second context workload and wherein restoring the saved first context state comprises restoring the saved first context state in response to receiving the first context ID.

Some embodiments include saving the state of the second context before restoring the saved first context state. In some embodiments saving the state of the first context workload comprises saving addresses for surfaces that are exercised by the first context workload.

Some embodiments pertain to an apparatus that includes a plurality of unique context memory buffers, an indirect context buffer, a graphics processor coupled to the unique context memory buffers and to the indirect context buffer, and a central processing unit to assign a context ID (Identifier) to each of a plurality of graphics applications to be executed by the graphics processor as contexts, to assign a unique context memory buffer to each context ID, to assign a unique indirect context pointer and a corresponding size to each context ID, the indirect context pointer pointing to an address in the indirect context buffer, to assign an indirect context offset to each context ID, the indirect context offset indicating an offset into the indirect context buffer, and to assign an indirect context buffer address range to each context ID. The graphics processor executes a part of a first context workload corresponding to an assigned context ID, indirects execution of the first context workload before completion of the execution, saves the state of the first context workload at the time of indirection to the assigned context memory buffer upon switching away from the first context, saving the indirect context pointer, the indirect context offset and a size of the indirect context buffer address range to registers that are independent of the saved context state, executes at least a part of a second context workload, restores the saved first context state after executing by accessing the saved indirect context pointer, the indirect context offset and the buffer size, and resumes executing the first context workload.

In some embodiments the graphics processor saves the state of the first context by saving instructions to the assigned context memory buffer for execution when restoring the saved first context state. In some embodiments the central processing unit loads commands into the indirect context buffer to override context state restore commands. In some embodiments the graphics processor restores the saved first context by executing commands in the context memory buffer and, upon reaching a context memory buffer address corresponding to the indirect context offset, fetching the indirect context pointer, suspending restoring from the context memory buffer and fetching from the memory addresses indicated by the indirect context pointer, executing commands stored in a buffer address corresponding to the indirect context pointer and then resuming restoring from the context memory buffer.

In some embodiments the graphics processor is further to save new values of the indirect context pointer and indirect context offset based on instructions executed from the memory addresses indicated by the indirect context pointer. In some embodiments the central processing unit is further to load the indirect context pointer offset and the indirect context pointer into corresponding registers and send an indirection command to the graphics processor to restore the saved first context.

Some embodiments pertain to a system that includes a display system for displaying graphics context workload results, a mass memory having a plurality of graphics applications, a graphics memory having a plurality of unique context memory buffers and an indirect context buffer, a graphics processor coupled to the unique context memory buffers and to the indirect context buffer, and a central processing unit to assign a context ID (Identifier) to each of a plurality of graphics applications to be executed by the graphics processor as contexts, to assign a unique context memory buffer to each context ID, to assign a unique indirect context pointer and a corresponding size to each context ID, the indirect context pointer pointing to an address in the indirect context buffer, to assign an indirect context offset to each context ID, the indirect context offset indicating an offset into the indirect context buffer, and to assign an indirect context buffer address range to each context ID.

The graphics processor executes a part of a first context workload corresponding to an assigned context ID, indirects execution of the first context workload before completion of the execution, saves the state of the first context workload at the time of indirection to the assigned context memory buffer upon switching away from the first context, saving the indirect context pointer, the indirect context offset and a size of the indirect context buffer address range to registers that are independent of the saved context state, executes at least a part of a second context workload, restores the saved first context state after executing by accessing the saved indirect context pointer, the indirect context offset and the buffer size, and resumes executing the first context workload.

In some embodiments the central processing unit loads commands into the indirect context buffer to override context state restore commands.

In some embodiments the graphics processor restores the saved first context by executing commands in the context memory buffer and, upon reaching a context memory buffer address corresponding to the indirect context offset, fetching the indirect context pointer, suspending restoring from the context memory buffer and fetching from the memory addresses indicated by the indirect context pointer, executing commands stored in a buffer address corresponding to the indirect context pointer and then resuming restoring from the context memory buffer.

In some embodiments the central processing unit is further to load the indirect context pointer offset and the indirect context pointer into corresponding registers and send an indirection command to the graphics processor to restore the saved first context.

Some embodiments pertain to a method that include sending a first context ID (identification) to a graphics processor, the context ID identifying a graphics application to be executed by the graphics processor, a unique context memory buffer, a unique indirect context pointer, a corresponding size, an indirect context offset, and a buffer address range, sending a second context ID to the graphics processor for execution by the graphics processor, resubmitting the first context ID to the graphics processor to command the graphics processor to resume execution of the first context, and assigning a value to a register used by the graphics processor to fetch instructions to resume execution of the first context In some embodiments graphics processor saves a current state of the first context to the identified context memory buffer before executing the second context. In some embodiments assigning a value includes updating a value of a first context pointer register used by the graphics processor as a base address for resuming execution of the first context, and updating a value of a first context pointer offset register used by the graphics processor as an offset from the base address for resuming execution of the first context.

Some embodiments pertain to a machine-readable medium having instructions stored thereon that when executed by the machine cause the machine to perform operations that include sending a first context ID (identification) to a graphics processor, the context ID identifying a graphics application to be executed by the graphics processor, a unique context memory buffer, a unique indirect context pointer, a corresponding size, an indirect context offset, and a buffer address range, sending a second context ID to the graphics processor for execution by the graphics processor, resubmitting the first context ID to the graphics processor to command the graphics processor to resume execution of the first context, and assigning a value to a register used by the graphics processor to fetch instructions to resume execution of the first context.

In some embodiments the graphics processor saves a current state of the first context to the identified context memory buffer before executing the second context.

In some embodiments assigning a value include updating a value of a first context pointer register used by the graphics processor as a base address for resuming execution of the first context, and updating a value of a first context pointer offset register used by the graphics processor as an offset from the base address for resuming execution of the first context.

Some embodiments pertain to an apparatus that includes a central processing unit to send a first context ID (identification) to a graphics processor, the context ID identifying a graphics application to be executed by the graphics processor, a unique context memory buffer, a unique indirect context pointer, a corresponding size, an indirect context offset, and a buffer address range, to send a second context ID to the graphics processor for execution by the graphics processor, to resub the first context ID to the graphics processor to command the graphics processor to resume execution of the first context, and to assign a value to a register used by the graphics processor to fetch instructions to resume execution of the first context.

In some embodiments assigning a value includes updating a value of a first context pointer register used by the graphics processor as a base address for resuming execution of the first context, and updating a value of a first context pointer offset register used by the graphics processor as an offset from the base address for resuming execution of the first context.

What is claimed is:

1. A method comprising:
    saving a state of a first context workload of a graphics application by a graphics processor at a time of indirection to an assigned first context memory buffer upon switching away from the first context, the saved state including hardware pipeline register addresses;
    saving an indirect context pointer, to registers that are independent of the saved first context state;
    saving commands to the independent registers to overwrite at least a portion of the saved hardware pipeline register addresses;
    restoring the saved first context state after executing at least part of a second context workload by accessing the saved indirect context pointer and by executing the saved commands to overwrite the saved hardware pipeline register addresses; and
    resuming executing the first context workload.

2. The method of claim 1, wherein the assigned context memory buffer is used by the graphics processor to save the state for the corresponding context.

3. The method of claim 1, wherein saving the state of the first context comprises saving instructions to the assigned context memory buffer for execution when restoring the saved first context state.

4. The method of claim 1 , wherein saving commands comprises loading commands into the indirect context buffer to override, context state restore commands.

5. The method of claim 4, wherein loading is a software process independent of the graphics processor restoring the saved first context.

6. The method of claim wherein restoring the saved first context comprises executing commands in the first context memory buffer and, upon reaching a context memory buffer address corresponding to the indirect context offset, fetching a saved indirect context pointer and executing saved commands of the independent registers, the saved commands being stored in a buffer address corresponding to the indirect context pointer.

7. The method of claim 6, wherein fetching the indirect context pointer and executing commands stored in a buffer address corresponding to the indirect context pointer comprises suspending restoring from the first context memory buffer and fetching from memory addresses indicated by the indirect context pointer.

8. The method of claim 7, further comprising after executing instructions fetched from the memory addresses indicated by the indirect context pointer then resuming restoring from the first context memory buffer.

9. The method of claim 8, wherein instructions executed from the memory addresses indicated by the indirect context pointer include saving new values of the indirect context pointer and indirect context offset.

10. The method of claim 1, wherein indirecting comprises at least one of suspending, preempting, and interrupting execution of the first context.

11. The method of claim 1, further comprising by a software agent that does not execute context workloads loading an indirect context pointer offset and an indirect context pointer into corresponding registers and sending an indirection command to restore the saved first context.

12. The method of claim 1, further comprising receiving a first context ID identifying the first context workload during execution of the second context workload and wherein restoring the saved first context state comprises, restoring the saved first context state in response to receiving the first context ID.

13. The method of claim 12, further comprising saving the state of the second context before restoring the saved first context state.

14. The method of claim 1. wherein saving the state of the first context workload comprises saving addresses for surfaces that are exercised by the first context workload.

15. At least one non-transitory computer-readable medium having instructions stored thereon that when executed by the machine cause the machine to perform operations comprising:
saving a state of a first context workload of graphics application by a graphics processor at a time of indirection to an assigned first context memory buffer upon switching away from the first context, the saved state including hardware pipeline register addresses;
saving an indirect context pointer to registers that are independent of the saved first context state;
saving commands to the independent registers to overwrite at least a portion of the save hardware pipeline register addresses;
restoring the saved first context state after executing at least part of a second context workload by accessing the saved indirect context pointer and by executing the saved commands to overwrite the saved hardware pipeline register addresses; and
resuming executing the first context workload.

16. The medium of claim 15, wherein executing the saved commands comprises saving new values of the indirect context pointer and an indirect context offset.

17. An apparatus comprising;
a plurality of unique context memory buffers;
an indirect context buffer;
a graphics processor coupled to the unique context memory buffers, to a central processing unit, and to the indirect context buffer; and
wherein the graphics processor executes a part of a first context workload corresponding to an assigned context ID, indirects execution of the first context workload before completion of the execution, saves the state of the first context workload at the time of indirection to an assigned context memory buffer upon switching away from the first context, the saved state including hardware pipeline register addresses, saves an indirect context pointer to registers that are independent of the saved context state, saves commands to the independent registers to overwrite at least a portion of the saved hardware pipeline register addresses, restores the saved first context state after executing at least part of a second context workload by accessing the saved indirect context pointer, and by executing the saved commands to overwrite the saved hardware pipeline register addresses, and resumes executing the first context workload.

18. The apparatus of claim 17, wherein the graphics processor restores the saved first context by executing commands in the context memory buffer and, upon reaching a context memory buffer address corresponding to an indirect context offset, fetches the indirect context pointer, suspending restoring from the context memory buffer and fetching from the memory addresses indicated by the indirect context pointer, executing commands stored in a buffer address corresponding to the indirect context pointer and then resuming restoring from the context memory buffer.

19. A system comprising:
a display system for displaying graphics context workload results;
a mass memory having a plurality of graphics applications;
a graphics memory having a plurality of unique context memory buffers and an indirect context buffer;
a graphics processor coupled to the unique context memory buffers and to the indirect context huffier; and
a central processing unit to assign a context ID (Identifier) to each of a plurality of graphics applications to be executed by the graphics processor as contexts, to assign a unique context memory buffer to each context ID, to assign a unique indirect context pointer and a corresponding size to each context ID, the indirect context pointer pointing to an address in the indirect context buffer, to assign an indirect context offset to each context ID, the indirect context offset indicating an offset into the indirect context buffer, and to assign an indirect context buffer address range to each context ID,
wherein the graphics processor executes a part of a first context workload corresponding to an assigned context ID, indirects execution of the first context workload before completion of the execution, saves the state of the first context workload at the time of indirection to the assigned context memory buffer upon switching away from the first context, the saved state including hardware pipeline register addresses, saves saving the indirect context pointer, the indirect context offset and a size of the indirect context buffer address range to registers that are independent of the saved context state, saves commands to the independent registers to overwrite at least a portion of the saved hardware pipeline register addresses, executes at least a part of a second context workload, restores the saved first context state after executing by accessing the saved indirect context pointer, the indirect context offset and the buffer size, and by executing the saved commands to overwrite the saved hardware pipeline register addresses, and resumes executing the first context workload.

20. A method comprising;
sending a first context ID (identification) to a graphics processor, the context ID identifying a graphics application to be executed by the graphics processor, a unique context memory buffer, a unique indirect context pointer, a corresponding size, an indirect context offset, and a buffer address range;
sending a second context ID to the graphics processor for execution by the graphics processor;
sending commands to the graphics processor to be saved to independent registers, the commands being to overwrite saved hardware pipeline register addresses of a first context corresponding to the first context ID upon resuming execution of the first context;

resubmitting the first context ID to the graphics processor to command the graphics processor to resume execution of the first context; and assigning a value to a register used by the graphics processor when executing the saved commands to fetch instructions to resume execution of the first context.

21. The method of claim 20, wherein the graphics processor saves a current state of the first context to the identified context memory buffer before executing the second context.

22. The method of claim 20, wherein assigning a value comprises:

updating a value of a first context pointer register used by the graphics processor as a base address for resuming execution of the first context; and updating a value of a first context pointer offset register used by the graphics processor as an offset from the base address for resuming execution of the first context.

23. At least one non-transitory computer-readable medium having instructions stored thereon that when executed by the machine cause the machine to perform operations comprising:

sending a first context ID (identification) to a graphics processor, the context ID identifying a graphics application to be executed by the graphics processor, a unique context memory buffer, a unique indirect context pointer, a corresponding size, an indirect context offset, and a buffer address range;

sending a second context ID to the graphics processor for execution by the graphics processor;

sending commands to the graphics processor to be saved to independent registers, the commands being to overwrite saved hardware pipeline register addresses of a first context corresponding to the first context ID upon resuming execution of the first context;

resubmitting the first context ID to the graphics processor to command the graphics processor to resume execution of the first context; and assigning a value to a register used by the graphics processor when executing the saved commands to fetch instructions to resume execution of the first context.

24. An apparatus comprising:

a central processing unit to send a first context ID (identification) to a graphics processor, the context ID identifying a first context graphics application to be executed by the graphics processor, a unique context memory buffer, a unique indirect context pointer, a corresponding size, an indirect context offset, and a buffer address range, to send a second context ID identifying a second context graphics application to the graphics processor for execution by the graphics processor, to send commands to the graphics processor to be saved to independent registers, the commands being to overwrite saved hardware pipeline register addresses of the first context upon resuming execution of the first context, to resubmit the first context ID to the graphics processor to command the graphics processor to resume execution of the first context, and to assign a value to a register used by the graphics processor when executing the saved commands to fetch instructions to resume execution of the first context.

25. The apparatus of claim 24, wherein assigning a value comprises:

updating a value of a first context pointer register used by the graphics processor as a base address for resuming execution of the first context; and updating a value of a first context pointer offset register used by the graphics processor as an offset from the base address for resuming execution of the first context.

* * * * *

UNITED STATES PATENT AND TRADEMARK OFFICE
CERTIFICATE OF CORRECTION

| | | |
|---|---|---|
| PATENT NO. | : 9,563,466 B2 | Page 1 of 1 |
| APPLICATION NO. | : 14/072622 | |
| DATED | : February 7, 2017 | |
| INVENTOR(S) | : Nalluri et al. | |

It is certified that error appears in the above-identified patent and that said Letters Patent is hereby corrected as shown below:

In the Claims

Column 19, Line 29, after "workload of", insert --a--.

Column 19, Line 37, delete "save" and insert --saved--.

Column 20, Line 23, delete "huffier" and insert --buffer--.

Signed and Sealed this
First Day of August, 2017

Joseph Matal
*Performing the Functions and Duties of the*
*Under Secretary of Commerce for Intellectual Property and*
*Director of the United States Patent and Trademark Office*